United States Patent
Madasu et al.

(10) Patent No.: US 11,236,596 B2
(45) Date of Patent: Feb. 1, 2022

(54) REAL-TIME DIVERSION CONTROL FOR STIMULATION TREATMENTS USING FIBER OPTICS WITH FULLY-COUPLED DIVERSION MODELS

(71) Applicant: Halliburton Energy Services, Inc., Houston, TX (US)

(72) Inventors: Srinath Madasu, Houston, TX (US); Yijie Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/465,281

(22) PCT Filed: Feb. 28, 2017

(86) PCT No.: PCT/US2017/020018
§ 371 (c)(1),
(2) Date: May 30, 2019

(87) PCT Pub. No.: WO2018/160171
PCT Pub. Date: Sep. 7, 2018

(65) Prior Publication Data
US 2019/0345803 A1    Nov. 14, 2019

(51) Int. Cl.
*E21B 43/25* (2006.01)
*E21B 43/26* (2006.01)
*G01V 99/00* (2009.01)

(52) U.S. Cl.
CPC ............ *E21B 43/255* (2013.01); *E21B 43/26* (2013.01); *G01V 99/005* (2013.01)

(58) Field of Classification Search
CPC ...... E21B 43/255; E21B 43/26; G01V 99/005
(Continued)

(56) References Cited

U.S. PATENT DOCUMENTS 9,135,475 B2    9/2015 Lecerf et al.
2004/0129418 A1*    7/2004 Jee .......................... E21B 43/26
166/250.01

(Continued)

FOREIGN PATENT DOCUMENTS

WO    WO 2013/070345 A1    5/2013
WO    WO 2016/126252 A1    8/2016
WO    WO 2017/099808 A2    6/2017

OTHER PUBLICATIONS

Gu et al., "Effect of Fracture Breakdown Pressure on Multicluster Hydraulic Fracturing Treatments," *American Rock Mechanics Association 49th US Rock Mechanics/Geomechanics Symposium*, Jun. 28-Jul. 1, 2015, San Francisco, California.

(Continued)

*Primary Examiner* — Matthew R Buck
*Assistant Examiner* — Patrick F Lambe
(74) *Attorney, Agent, or Firm* — Haynes and Boone, LLP

(57) ABSTRACT

System and methods of controlling fluid diversion during stimulation treatments are provided. Real-time measurements are obtained from a plurality of fiber-optic data sources at a well site during a stimulation treatment being performed along a portion of a wellbore within a subsurface formation. Fracture growth and stress within the subsurface formation surrounding the portion of the wellbore are determined as the stimulation treatment is performed, based on the real-time measurements and a fully-coupled diversion model. An amount of diverter for a diversion phase of the stimulation treatment to be performed along the portion of the wellbore is determined, based on the fracture growth and the stress within the subsurface formation. The diversion phase of the stimulation treatment is performed by injecting the amount of diverter into the subsurface formation via at (Continued)

least one injection point located along the portion of the wellbore.

18 Claims, 8 Drawing Sheets

(58) Field of Classification Search
USPC .................................................. 166/305.1
See application file for complete search history.

(56) References Cited

U.S. PATENT DOCUMENTS

| | | | |
|---|---|---|---|
| 2007/0095528 A1 | 5/2007 | Ziauddin et al. | |
| 2008/0183451 A1 | 7/2008 | Weng et al. | |
| 2010/0307755 A1 | 12/2010 | Xu et al. | |
| 2011/0088462 A1 | 4/2011 | Samson et al. | |
| 2013/0333476 A1* | 12/2013 | Omichi | G01H 9/004 73/655 |
| 2019/0204192 A1* | 7/2019 | Jaaskelainen | G01N 29/04 |
| 2019/0309618 A1* | 10/2019 | Inyang | E21B 49/00 |

OTHER PUBLICATIONS

Hagoort et al., "Modeling the Propagation of Waterflood-Induced Hydraulic Fractures," *Society of Petroleum Engineers Journal*, vol. 20, Issue No. 4, Aug. 1980.

Hill et al., "Fluid Placement and Diversion in Matrix Acidizing," *Society of Petroleum Engineers University of Tulsa Centennial Petroleum Engineering Symposium*, Aug. 29-31, 1994, Tulsa, Oklahoma.

International Search Report and the Written Opinion of the International Search Authority, or the Declaration, dated Nov. 9, 2017, PCT/US2017/020018, 15 pages, ISA/KR.

Li et al., "Research and Application of Mathematical Model for Foam Diversion Acidizing," *Society of Petroleum Engineers Western Regional and Pacific Section AAPG Joint Meeting*, Mar. 29-Apr. 4, 2008, Bakersfield, California.

* cited by examiner

REAL-TIME DIVERSION CONTROL FOR STIMULATION TREATMENTS USING FIBER OPTICS WITH FULLY-COUPLED DIVERSION MODELS

CROSS-REFERENCE TO RELATED APPLICATIONS

The present application is a U.S. National Stage patent application of International Patent Application No. PCT/US2017/020018, filed on Feb. 28, 2017, the benefit of which is claimed and the disclosure of which is incorporated herein by reference in its entirety.

FIELD OF THE DISCLOSURE

The present disclosure relates generally to the design of hydraulic fracturing treatments for stimulating hydrocarbon production from subsurface reservoirs, and particularly, to techniques for controlling the placement and distribution of injected fluids during such stimulation treatments.

BACKGROUND

In the oil and gas industry, a well that is not producing as expected may need stimulation to increase the production of subsurface hydrocarbon deposits, such as oil and natural gas. Hydraulic fracturing is a type of stimulation treatment that has long been used for well stimulation in unconventional reservoirs. A multistage stimulation treatment operation may involve drilling a horizontal wellbore and injecting treatment fluid into a surrounding formation in multiple stages via a series of perforations or formation entry points along a path of a wellbore through the formation. During each of the stimulation treatment, different types of fracturing fluids, proppant materials (e.g., sand), additives and/or other materials may be pumped into the formation via the entry points or perforations at high pressures to initiate and propagate fractures within the formation to a desired extent. With advancements in horizontal well drilling and multi-stage hydraulic fracturing of unconventional reservoirs, there is a greater need for ways to accurately monitor the downhole flow and distribution of injected fluids across different perforation clusters and efficiently deliver treatment fluid into the subsurface formation.

Diversion is a technique used in injection treatments to facilitate uniform distribution of treatment fluid over each stage of the treatment. Diversion may involve the delivery of a diverting agent (or "diverter") into the wellbore to divert injected treatment fluids toward formation entry points along the wellbore path that are receiving inadequate treatment. Examples of such diverter include, but are not limited to, viscous foams, particulates, gels, benzoic acid and other chemical diverters. Traditionally, operational decisions related to the use of diversion technology for a given treatment stage, including when and how much diverter is used, are made a priori according to a predefined treatment schedule. However, conventional diversion techniques based on such predefined treatment schedules fail to account for actual operating conditions that affect the downhole flow distribution of the treatment fluid over the course of the stimulation treatment.

DESCRIPTION OF ILLUSTRATIVE EMBODIMENTS

Figure 1:
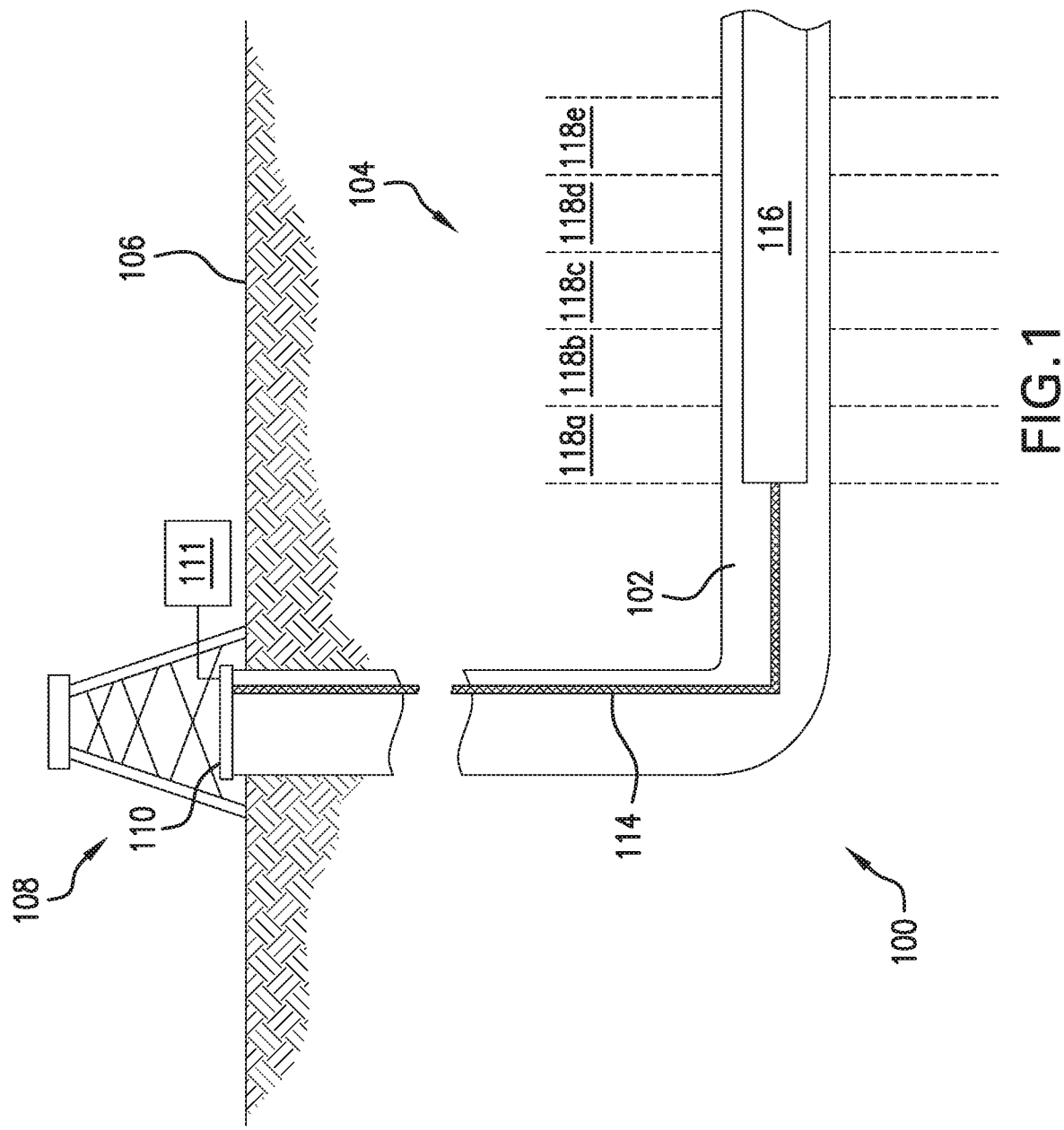
FIG. 1 is a diagram of an illustrative wellbore system for performing a multistage stimulation treatment within a subsurface hydrocarbon-bearing formation.

Embodiments of the present disclosure relate to real-time monitoring and control of fluid diversion for downhole stimulation treatments. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As will be described in further detail below, embodiments of the present disclosure may be used to make real-time operational decisions regarding the use of diversion to control or adjust the flow distribution of treatment fluid during a stimulation treatment. The stimulation treatment may involve injecting the treatment fluid into a subsurface formation via one or more injection points along a portion of a wellbore within the subsurface formation, where each injection point may correspond to a perforation cluster. In one or more embodiments, real-time measurements obtained from one or more fiber-optic data sources at the wellsite may be combined with a fully-coupled diversion model to determine fracture growth and formation stress over the course of the stimulation treatment. Such real-time measurements may include, for example, Distributed Acoustic Sensing (DAS), Distributed Temperature Sensing (DTS), and Distributed Strain Sensing (DSS) measurements. The fully-coupled diversion model may be a combination of various physical models that are fully coupled for representing the dynamic fluid-solid mechanics in the wellbore and surrounding formation during the stimulation treatment. For example, the fully-coupled diversion model may include one or more wellbore models and one or more geomechanical models of the formation. The DAS and/or DTS measurements may be applied to the wellbore model(s) to determine fracture growth, based on fluid flow, fluid pressure, and fracture geometry within a fractured area of the formation surrounding a portion of the wellbore. The DSS measurements may be applied to the geomechanical model(s) to determine stress or a stress field within the surrounding formation during the stimulation treatment along the portion of the wellbore.

Illustrative embodiments and related methodologies of the present disclosure are described below in reference to the examples shown in FIGS. 1-8 as they might be employed in, for example, a computer system for real-time monitoring and control of diversion during stimulation treatments. Various features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of a multistage hydraulic fracturing treatment, it should be appreciated that the real-time flow distribution monitoring and diversion control techniques are not intended to be limited thereto and that these techniques may be applied to other types of stimulation treatments, e.g., matrix acidizing treatments.

FIG. 1 is a diagram illustrating an example of a wellbore system 100 for performing a stimulation treatment within a hydrocarbon reservoir formation. As shown in the example of FIG. 1, wellbore system 100 includes a wellbore 102 in a subsurface formation 104 beneath a surface 106 of the wellsite. Although wellbore 102 is shown in the example of FIG. 1 as a horizontal wellbore, it should be appreciated that embodiments of the present disclosure are not limited thereto and that the disclosed diversion control techniques may be applied to wellbores in any orientation including, but not limited to, horizontal, vertical, slant, curved, and/or a combination thereof. The subsurface formation 104 in this example may include a reservoir of hydrocarbon deposits, such as oil, natural gas, and/or others. For example, the subsurface formation 104 may be a rock formation (e.g., shale, coal, sandstone, granite, and/or others) that includes oil and natural gas deposits trapped within one or more layers of the formation. In some cases, the subsurface formation 104 may be a tight gas formation that includes low permeability rock (e.g., shale, coal, and/or others). The subsurface formation 104 may be composed of naturally fractured rock and/or rock formations that are not fractured to any significant degree.

In one or more embodiments, wellbore system 100 may also include a fluid injection system 108 for injecting treatment fluid, e.g., hydraulic fracturing fluid, into the subsurface formation 104 over multiple sections 118a, 118b, 118c, 118d, and 118e (collectively referred to herein as "sections 118") of the wellbore 102, as will be described in further detail below. Each of the sections 118 may correspond to, for example, a different stage or interval of the multistage stimulation treatment that is performed along a portion of the wellbore 102. The boundaries of the respective sections 118 and corresponding treatment stages/intervals along the length of the wellbore 102 may be delineated by, for example, the locations of bridge plugs, packers and/or other types of equipment in the wellbore 102. Additionally or alternatively, the sections 118 and corresponding treatment stages may be delineated by particular features of the subsurface formation 104. Although five sections are shown in FIG. 1, it should be appreciated that any number of sections and/or treatment stages may be used as desired for a particular implementation. Furthermore, each of the sections 118 may have different widths or may be uniformly distributed along the wellbore 102.

As shown in FIG. 1, injection system 108 in this example includes an injection control subsystem 111 at the surface 106 along with a signaling subsystem 114 and one or more injection tools 116 within the wellbore 102. The injection control subsystem 111 may communicate with the injection tools 116 from a surface 110 of the wellbore 102 via the signaling subsystem 114. Although not shown in FIG. 1, injection system 108 may include additional and/or different features for implementing the diversion control techniques disclosed herein. For example, the injection system 108 may include any number of computing subsystems, communication subsystems, pumping subsystems, monitoring subsystems, and/or other features as desired for a particular implementation. In some implementations, the injection control subsystem 111 may be communicatively coupled to a remote computing system (not shown) for exchanging information via a network for purposes of monitoring and controlling wellsite operations, including operations related to the stimulation treatment. Such a network may be, for example and without limitation, a local area network, medium area network, and/or a wide area network, e.g., the Internet.

During each stage of the stimulation treatment, the injection system 108 may alter stresses and create a multitude of fractures in the subsurface formation 104 by injecting treatment fluid (e.g., hydraulic fracturing fluid) into the surrounding subsurface formation 104 via a plurality of injection points or perforation cluster along a portion of the wellbore 102 (e.g., along one or more of sections 118). The fluid may be injected through any combination of one or more valves of the injection tools 116. The injection tools 116 may include numerous components including, but not limited to, valves, sliding sleeves, actuators, ports, and/or other features that communicate treatment fluid from a working string disposed within the wellbore 102 into the subsurface formation 104 via the injection points. The injection points along the wellbore 102 may be, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing.

The injection tools 116 may also be used to perform diversion in order to control or adjust the downhole flow distribution of the treatment fluid across the various injection points or perforations during each stage of the treatment. Thus, the flow of fluid and delivery of diverter into the subsurface formation 104 during the stimulation treatment may be controlled by the configuration of the injection tools 116. The diverter injected into the subsurface formation 104 may be, for example, a degradable polymer. Examples of different degradable polymer materials that may be used to perform diversion include, but are not limited to, polysaccharides; lignosulfonates; chitins; chitosans; proteins; proteinous materials; fatty alcohols; fatty esters; fatty acid salts; aliphatic polyesters; poly(lactides); poly(glycolides); poly (ε-caprolactones); polyoxymethylene; polyurethanes; poly (hydroxybutyrates); poly(anhydrides); aliphatic polycarbonates; polyvinyl polymers; acrylic-based polymers; poly (amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalates, and copolymers, blends, derivatives, or combinations thereof. However, it should be appreciated that embodiments of the present disclosure are not intended to be limited thereto and that other types of diverter materials may also be used.

In some implementations, the valves, ports, and/or other features of the injection tools 116 can be configured to control the location, rate, orientation, and/or other properties of fluid flow between the wellbore 102 and the subsurface formation 104. The injection tools 116 may include multiple tools coupled by sections of tubing, pipe, or another type of conduit. The injection tools may be isolated in the wellbore 102 by packers or other devices installed in the wellbore 102.

In one or more embodiments, the injection system 108 may be used to create or modify a complex fracture network in the subsurface formation 104 by injecting fluid into portions of the subsurface formation 104 where stress has been altered. For example, the complex fracture network may be created or modified after an initial injection treatment has altered stress by fracturing the subsurface formation 104 at multiple locations along the wellbore 102. After the initial injection treatment alters stresses in the subterranean formation, one or more valves of the injection tools 116 may be selectively opened or otherwise reconfigured to stimulate or re-stimulate specific areas of the subsurface formation 104 along one or more sections 118 of the wellbore 102, taking advantage of the altered stress state to create complex fracture networks. In some cases, the injection system 108 may be used to inject treatment fluid simultaneously for multiple intervals and sections 118 of wellbore 102.

The operation of the injection tools 116 may be controlled by the injection control subsystem 111. The injection control subsystem 111 may include, for example, data processing equipment, communication equipment, and/or other systems that control injection treatments applied to the subsurface formation 104 through the wellbore 102. In one or more embodiments, the injection control subsystem 111 may receive, generate, or modify a baseline treatment plan for implementing the various stages of the stimulation treatment along the path of the wellbore 102. The baseline treatment plan may specify initial parameters for the treatment fluid to be injected into the subsurface formation 104. The treatment plan may also specify a baseline pumping schedule for the treatment fluid injections and diverter deployments over each stage of the stimulation treatment.

In one or more embodiments, the injection control subsystem 111 initiates control signals to configure the injection tools 116 and/or other equipment (e.g., pump trucks, etc.) for operation based on the treatment plan. The signaling subsystem 114 as shown in FIG. 1 transmits the signals from the injection control subsystem 111 at the wellbore surface 110 to one or more of the injection tools 116 disposed in the wellbore 102. For example, the signaling subsystem 114 may transmit hydraulic control signals, electrical control signals, and/or other types of control signals. The control signals may be reformatted, reconfigured, stored, converted, retransmitted, and/or otherwise modified as needed or desired en route between the injection control subsystem 111 (and/or another source) and the injection tools 116 (and/or another destination). The signals transmitted to the injection tools 116 may control the configuration and/or operation of the injection tools 116. Examples of different ways to control the operation of each of the injection tools 116 include, but are not limited to, opening, closing, restricting, dilating, repositioning, reorienting, and/or otherwise manipulating one or more valves of the tool to modify the manner in which treatment fluid, proppant, or diverter is communicated into the subsurface formation 104.

It should be appreciated that the combination of injection valves of the injection tools 116 may be configured or reconfigured at any given time during the stimulation treatment. It should also be appreciated that the injection valves may be used to inject any of various treatment fluids, proppants, and/or diverter materials into the subsurface formation 104. Examples of such proppants include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

In some implementations, the signaling subsystem 114 transmits a control signal to multiple injection tools, and the control signal is formatted to change the state of only one or a subset of the multiple injection tools. For example, a shared electrical or hydraulic control line may transmit a control signal to multiple injection valves, and the control signal may be formatted to selectively change the state of only one (or a subset) of the injection valves. In some cases, the pressure, amplitude, frequency, duration, and/or other properties of the control signal determine which injection tool is modified by the control signal. In some cases, the pressure, amplitude, frequency, duration, and/or other properties of the control signal determine the state of the injection tool affected by the modification.

In one or more embodiments, the injection tools 116 may include various sensors for collecting data relating to downhole operating conditions and formation characteristics along the wellbore 102. Such sensors may serve as real-time data sources at the wellsite for various types of downhole measurements and diagnostic information pertaining to each stage of the stimulation treatment. Examples of such sensors include, but are not limited to, micro-seismic sensors, tiltmeters, pressure sensors, and other types of downhole sensing equipment. The data collected downhole by such sensors may include, for example, real-time measurements and diagnostic data for monitoring the extent of fracture growth and complexity within the surrounding formation along the wellbore 102 during each stage of the stimulation treatment, e.g., corresponding to one or more sections 118.

In one or more embodiments, the injection tools 116 may include fiber-optic sensors for collecting real-time fiber-optic measurements during the stimulation treatment. For example, the fiber-optic sensors may be components of DAS, DTS, and/or DSS subsystems of the injection system 108. However, it should be appreciated that embodiments are not intended to be limited thereto and that the injection tools 116 may also include any of various measurement and diagnostic tools. In some implementations, the injection tools 116 may be used to inject particle tracers, e.g., tracer slugs, into the wellbore 102 for monitoring the flow distribution based on the distribution of the injected particle tracers during the treatment. For example, such tracers may have a unique temperature profile that the DTS subsystem of the injection system 108 can be used to monitor over the course of a treatment stage.

In one or more embodiments, the signaling subsystem 114 may be used to transmit real-time measurements and diagnostic data collected downhole by one or more of the aforementioned data sources to the injection control subsystem 111 for processing at the wellbore surface 110. Thus, in the fiber-optics example above, the real-time measurements collected by the fiber-optic sensors may be transmitted to the injection control subsystem 111 via fiber-optic cables included within the signaling subsystem 114. The injection control subsystem 111 (or data processing components thereof) may use the real-time measurements received from such fiber-optic data sources to monitor fracture growth and stress within the formation as the stimulation treatment is performed along the wellbore 102. In one or more embodiments, the real-time data may be applied to a fully-coupled diversion model to determine an appropriate amount of diverter to be injected into the formation via injection points along the wellbore 102, as will be described in further detail below.

Figure 2:
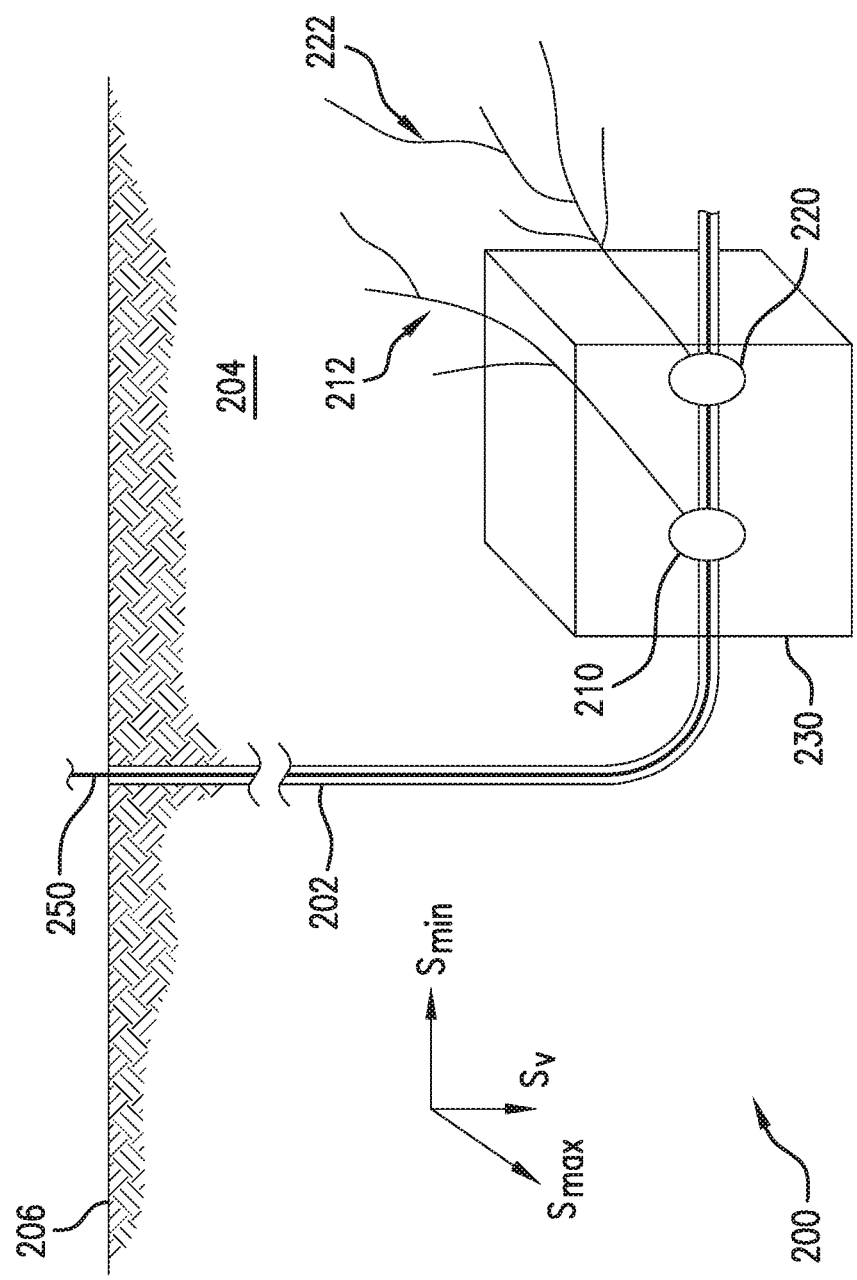
FIG. 2 is a diagram of an illustrative a computational representation of certain aspects of a wellbore system and the underlying formation geometry.

FIG. 2 is a diagram of an illustrative a computational representation of certain aspects of a wellbore system 200 and the underlying formation geometry. As shown in FIG. 2, a wellbore system 200 includes a wellbore 202 penetrating at least a portion of a subterranean formation 204. The wellbore 202 includes injection points 210 and 220 at which one or more treatment fluids may be injected to stimulate hydrocarbon production from the formation 204. For example, fracturing fluid may be injected into the formation 204 via the injection points 210 and 220 during a stimulation treatment performed along the wellbore 202. Each of the injection points 210 and 220 may correspond to a perforation cluster including a plurality of perforations along a portion of the wellbore 202.

The injection of the treatment fluids into the formation 204 via injection points 210 and 220 may cause fractures 212 and 222, respectively, to open within the formation 204. In addition to the treatment fluid, proppant may be injected into the formation 204 via the injection points 210 and 220 to prevent the fractures 212 and 222 from closing due to the pressure from the surrounding formation. As shown in FIG. 2, each of the fractures 212 and 222 may include multiple fractures that propagate through the formation 204 as part of a fracture network starting from each injection point. Each fracture network may have a plurality of junctions connecting different branches of the network including fractures of the network that propagate in different directions through the formation 204. It should be appreciated that the number of junctions and fractures of each network may vary from one formation to another depending on the particular characteristics of each formation.

The formation 204 in this example may be any of various subterranean geological rock formations (e.g., shale or carbonate) suitable for performing different types of stimulation treatments including, for example, hydraulic fracturing or matrix-acidizing or any other type of treatment operation. The formation 204 may be, for example, a porous hydrocarbon reservoir formation, whose pore volumes are initially saturated with reservoir fluids (e.g. oil, gas, and/or water). Prior to the stimulation treatment, the solid rock blocks of the formation 204 may be at a structural equilibrium, and the fluids within its pores may be at rest. During the stimulation treatment, a pressure difference between the solid stress of the formation 204 and each of the fractures 212 and 222 causes hydrocarbons to flow into each fracture.

Also, during the stimulation treatment, diverter may be injected into the formation 204 via the injection point 210 and 220 in order to restrict the flow of injected fluids to certain perforations and thereby divert the fluids toward other perforations along the wellbore 202. Flow restriction caused by the diverter may increase the pressure at the surface of the wellbore 202. The surface pressure may be measured using, for example, a pressure sensor coupled to an inlet 250 of the wellbore 202. In one or more embodiments, the pressure sensor may be positioned alongside a flow rate sensor at the inlet 250 of the wellbore 202 to collect both pressure and flow rate measurements in real time during the stimulation treatment. In addition to the flow rate and pressure sensors, wellbore system 200 may include various data sources for collecting real-time measurements using fiber optics. Such fiber-optic data sources may include, but are not limited to, DAS, DTS, and DSS systems. It should be appreciated that the various data sources of the wellbore system 200 or different components thereof may be located at the surface of the wellbore 202 and/or downhole, e.g., sensors coupled to a downhole tool disposed within the wellbore 202.

In one or more embodiments, the measured inlet flow rate and pressure data may be applied as inputs to a fully-coupled diversion model for determining fracture growth and stress within the formation 204 and making operational decisions relating to the use of diverter during the stimulation treatment accordingly. Such operational decisions may include, for example and without limitation, whether or not to perform diversion, how much diverter to use if diversion is performed, and how to develop or adjust a diverter pumping schedule of a baseline treatment plan.

In one or more embodiments, the inputs of the fully-coupled diversion model may include one or more wellbore treatment inputs and one or more formation inputs. The wellbore treatment inputs may be used to characterize the stimulation treatment operation along different portions of the wellbore 202 within the formation 204. In addition to the aforementioned flow rate and pressure at the inlet 250 of the wellbore 202, other wellbore treatment inputs may include, but are not limited to, an amount of diverter pumped into the wellbore 202 (e.g., according to the baseline diverter pumping schedule), the wellbore pressure at the injection points 210 and 220, a wellbore depth, a wellbore diameter, a number of perforation clusters along the wellbore 202 (or relevant portion thereof), a perforation cluster length, a perforation diameter, a distance between perforation clusters, a diverter particle diameter, and any combination thereof. In one or more embodiments, one or more of the wellbore treatment inputs of the fully-coupled diversion model in this example may be determined using various wellbore models along with real-time DAS and DTS measurements.

The formation inputs of the fully-coupled diversion model may be used to characterize the formation 204 or portion thereof. Examples of such formation inputs may include, but are not limited to, formation geometry, formation stress field, pore pressure, formation temperature, and any other relevant formation properties. In one or more embodiments, one or more of these formation inputs may be determined using a geomechanical model of the formation 204 along with real-time DSS measurements. The geomechanical model may be, for example, a three-dimensional model 230 of the fractured area of the formation 204 surrounding injection points 210 and 220 along the wellbore 202, as shown in FIG. 2. In one or more embodiments, the geomechanical model and the aforementioned wellbore models may be incorporated into the fully-coupled diversion model for determining fracture growth and stress within the formation based on real-time DAS, DTS, and DSS measurements acquired during the stimulation treatment, as will be described in further detail below with respect to FIG. 3.

Figure 3:
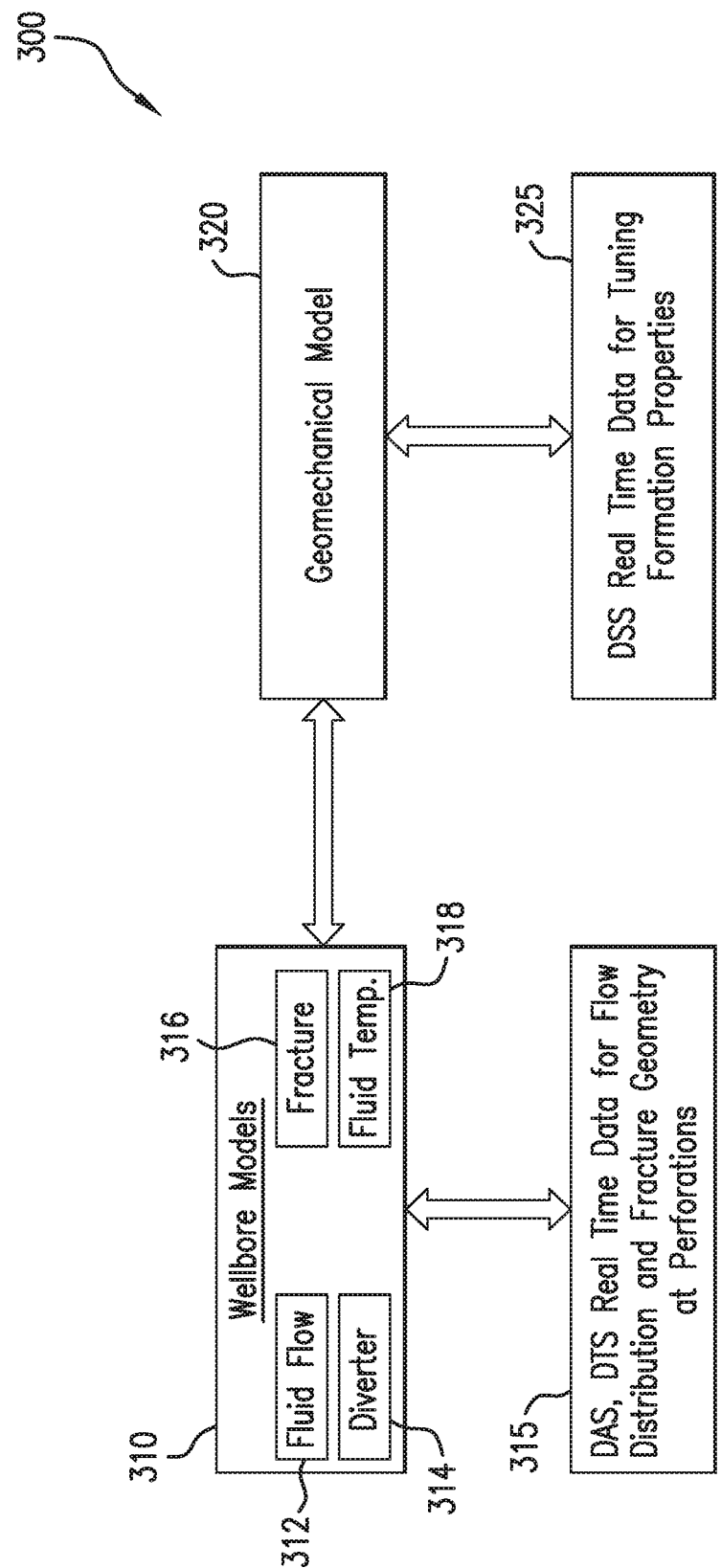
FIG. 3 is a schematic representation of a fully-coupled diversion model for determining fracture growth and stress within a subsurface formation based on real-time fiber-optic measurements.

FIG. 3 is a schematic representation of a fully-coupled diversion model 300 for determining fracture growth and stress within a subsurface formation based on real-time fiber-optic measurements acquired during a stimulation treatment along a wellbore within the formation. As shown in FIG. 3, the fully-coupled diversion model 300 may include a set of wellbore models 310 coupled to a geomechanical model 320 of the subsurface formation. The wellbore models 310 may include, for example, a combination of a fluid flow model 312, a diverter model 314, a fracture model 316, and fluid temperature model 318.

In one or more embodiments, the fluid flow model 312 may be a one-dimensional (1D) model for determining flow rate at one or more injection points or perforation clusters along the wellbore based on known inlet flow rates and pressure. Such a 1D flow model may be expressed using Equations (1) and (2) as follows:

$$p_x - \rho g + f = 0 \quad (1)$$

$$Q - Q_L = 0 \quad (2)$$

where p and Q represent the fluid pressure along the wellbore, x is the wellbore alignment direction, ρ is the fluid density and $Q_L$ represents the leak-off rate (into the formation) through the perforations. The subscript x indicates the derivative with respect to the variable in the subscript. The unknown variable in each of Equations (1) and (2) is the pressure p and Q, respectively.

In one or more embodiments, solutions for Equations (1) and (2) may be determined using appropriate boundary conditions based on the real-time data 315 obtained from fiber-optic data sources at the wellsite. Real-time data 315 in this example may include DAS and/or DTS measurements obtained during the stimulation treatment. Examples of the boundary conditions that may be determined using this data include, but are not limited to, the measured flow-rate or pressure at the wellbore inlet, the pressure at the perforations along the wellbore, zero-flow rate at the end of the wellbore (or the measured bottom-hole pressure), and zero flow-rate on the closed end of the fracture (or the known reservoir pressure). It should be appreciated that any combination of the above boundary conditions may be imposed as desired for a particular implementation.

Although the 1D flow model in this example is described using Equations (1) and (2) above, it should be appreciated that the disclosed embodiments are not limited thereto and that other 1D flow equations may be used instead. For example, other 1D flow equations, which may be more physically accurate in more challenging flow regimes, may be derived from the full Navier-Stokes equations. The unknown variables in such equations may include the fluid pressure and velocity.

In one or more embodiments, a diverter model 314 may be used to determine a mass of the diverter to be injected into the formation during a diversion phase of the stimulation treatment. It is well-known that diverter starts to bridge at points where the ratio of the fracture width to the diverter particle diameter is greater than two. Hence, this ratio may be used to determine the length at which the bridging starts, and the determined length may be applied as an input to the diverter model 314 in order to calculate the diverter mass, e.g., as expressed by Equation (3) as follows:

$$M = \rho_D(wL_Bh + \text{Volume of perforations}) \quad (3)$$

where $\rho_D$ is the density of the diverter, w is the height of the fracture, h is the height of the fracture, and $L_B$ is the bridging length.

In one or more embodiments, the fracture model 316 may be used to represent a network of fractures (e.g., fractures 212 or 222 of FIG. 2, as described above) within the subsurface formation. As described above, each fracture network may propagate through the formation starting from an injection point (e.g., injection point 210 or 220 of FIG. 2) or perforation cluster along the wellbore. Various fluid continuity conditions may be imposed at the junctions of each fracture within the network, depending on the type and spatial dimension of the flow equations used to model each individual fracture connected to a junction. The flow split among the different perforation clusters may be determined from the DAS data in real time.

In one or more embodiments, the length of the fracture may be determined from the DTS measurements using the fluid temperature model 318. The fluid temperature model 318 may provide a representation of the fluid temperature inside the fracture. The fluid temperature model 318 may be expressed using a second order differential equation as follows:

$$\frac{d^2T}{dx^2} - \frac{\rho C_p}{K}\left(\frac{q}{2wh}\right)\left(\frac{dT}{dx}\right) - \frac{\beta\mu}{kK}\left(\frac{q}{2wh}\right)^2 T + \frac{2\mu}{kK}\left(\frac{q}{2wh}\right)^2 = 0 \quad (4)$$

where x represents the spatial coordinates along the reservoir coordinates, $C_p$ is the specific heat constant, q is the convective heat transfer coefficient, $\mu_{JT}$ is the Joule-Thompson coefficient, β is the thermal expansion coefficient, h is the height of the fracture, L is the length of the fracture, w is the width of the fracture, k is the permeability of the fracture, and K is the thermal conductivity of the fluid.

For Equation (3) above, it may be assumed that the treatment fluid is a slightly compressible fluid with constant properties, that there is no leak off velocity inside fracture and that the geothermal temperature in the fracture is known or predetermined. The solution for this second order differential equation may be expressed using Equation (5) as follows:

$$T = c_1 e^{m1x} + c_2 e^{m2x} + \frac{2}{\beta} \tag{5}$$

where $c_1$, $c_2$ may be calculated using a known reservoir temperature and a temperature gradient derived from DTS measurements included with the real-time measurements 315 acquired at the wellbore-fracture interface. Such temperature data may be matched with the known or measured temperature in the fracture in order to obtain the fracture length ($L_f$). The width and height of the fracture may be determined using additional models for the fracture propagation pressure ($P_{fp}$) and the volume of the fracture ($V_{fp}$), e.g., using Equations (6)-(8):

$$P_{fp} = \sigma_h + \frac{K_{IC}}{\sqrt{\pi L_f}} \tag{6}$$

$$w = \frac{2(1-v^2)}{E}(P - P_{fp})L_f \tag{7}$$

$$Qt = V_{fP} = wL_f h \tag{8}$$

where $\sigma_h$ is the horizontal principle stress, $K_{IC}$ is the critical stress intensity factor, h is the fracture height, w is the fracture width, v is Poisson's ratio, E is the Young's modulus, and Qt is the flow rate at time t. A linear pressure profile from the wellbore to the tip of the fracture may be assumed for purposes of determined the height of the fracture in this example.

In one or more embodiments, Equations (6)-(8) above may be iteratively solved to determine the fracture geometry at each injection point or perforation cluster along the wellbore. Further, a wellbore flow distribution may be determined based on flow rates in the perforation clusters as derived from the real-time DAS and/or DTS data 315.

In one or more embodiments, a wellbore pressure distribution may be determined based on the flow distribution and Equation (6) above. The flow distribution and pressure distribution may then be applied as boundary conditions to geomechanical model 320 for determining the in-situ stress field and/or other properties of the surrounding formation. The determination of the fracture propagation pressure in Equation (6) may be based on the assumption that the length of the fracture is twice the radius of the wellbore. In one or more embodiments, real-time DSS data 325 may include formation strain measurements that are applied to the geomechanical model 320 in order to fine-tune or improve the accuracy of the formation properties that are determined using the model 320. In one or more embodiments, the geomechanical model 320 may be a three-dimensional (3D) model of the formation, as shown in FIG. 4.

Figure 4:
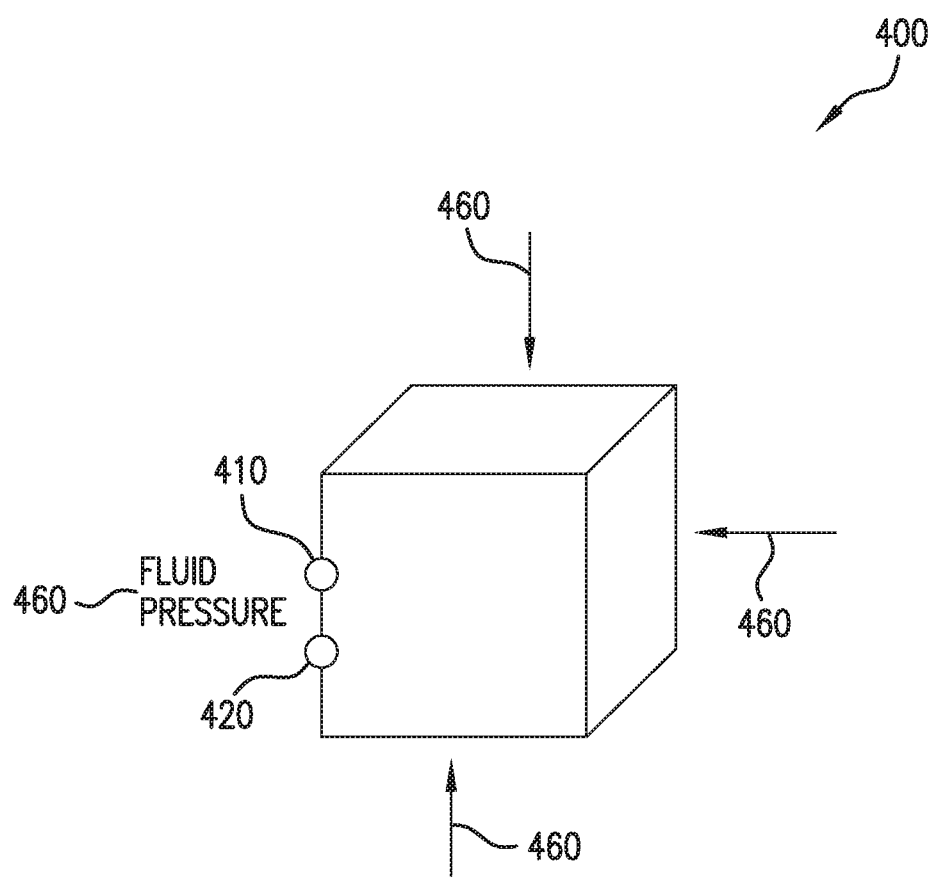
FIG. 4 is a diagram illustrating an example of a three-dimensional geomechanical model of a subsurface formation with boundary conditions applied from fluid pressure and in-situ stresses within the formation.

In FIG. 4, a geomechanical model 400 of a subsurface formation is shown with boundary conditions applied from fluid pressure and in-situ stresses within the formation. The geomechanical model 400 may represent, for example, multiple blocks of rock within the formation. The rock blocks may be deformed by pressure forces 460 from the fluid entering the formation and acting on the formation boundaries and at fracture junctions 410 and 420. In some implementations, the geomechanical model 400 may be used to represent a portion, e.g., a 3D cell, of a larger geomechanical model, in which a plurality of cells may be used to represent different blocks of the rock formation. Each cell of such a large-scale 3D model may represent an individual block of rock within a corresponding 3D volume of the formation. Thus, the geomechanical model 400 in this example may represent one of several rock blocks. It should be appreciated that any various geomechanical models may be used to represent the solid mechanics of individual blocks. Appropriate constraints may be applied to any model(s) representing blocks adjacent to the boundary of a hydrocarbon reservoir within the formation.

In one or more embodiments, the amount of formation deformation under fluid pressure may be determined using any suitable method including, but not limited to, a Finite Element Method (FEM) or Boundary Element Method (BEM). A system of quasi steady equations may be formulated for the formation dynamics using FEM as the following equation:

$$Kx = F \tag{9}$$

where K is the stiffness matrix, x is the displacements vector and F is the force vector. In one or more embodiments, the fluid pressure force may provide a force boundary condition for the formation.

In one or more embodiments, the stress intensity factor and formation properties, such as Young's modulus and Poisson's ratio, may be appropriately adjusted or tuned using real-time DSS measurements (e.g., DSS data 325 of FIG. 3) to improve the accuracy of the fracture geometry. In some implementations, finite element meshes for representing individual rock blocks in the geomechanical model 400 may be predetermined by a user. Additionally or alternatively, the finite element meshes may be optimized based on accuracy or computational efficiency requirements. For example, the geomechanical model 400 may be linear elasticity discretized using piecewise linear finite element shape functions on the coarsest possible triangulation of the block. In another example, a finer grid of the formation blocks or higher-order displacement shape functions may be used, which may lead to a higher-order piecewise polynomial model. The equilibrium balance of the geomechanical model 400 may comprise additional components including, but not limited to, pore pressure, multiphase reservoir fluid flow, temperature, and any combination thereof. However, in some embodiments, these additional components may increase computational time and reduce the efficiency of the model in real-time applications.

Figure 5:
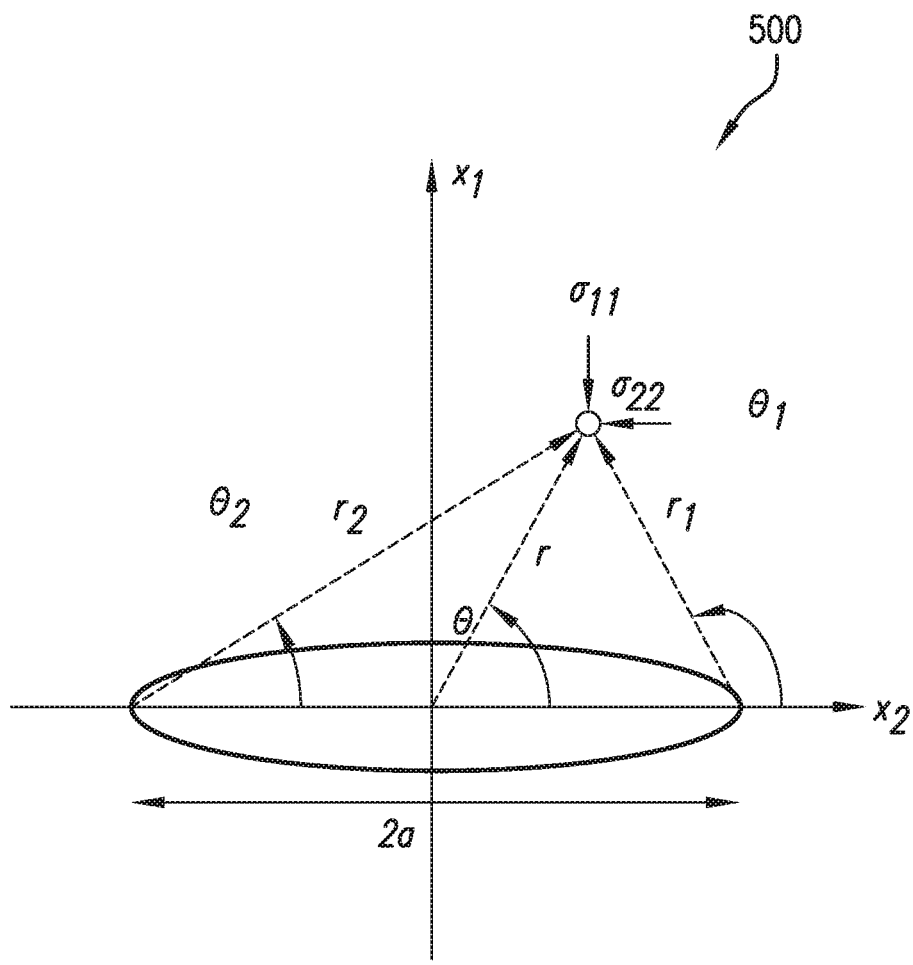
FIG. 5 is a diagram of an illustrative stress field for a given fracture geometry within a subsurface formation.

In one or more embodiments, an analytical technique for determining the stress field within the formation may be used to improve performance and reduce computational time. Such an analytical technique may be expressed using Equations (10)-(17) as follows:

$$\frac{1}{2}(\sigma_{22} + \sigma_{11}) = -\Delta p_f \left\{ \frac{r}{\sqrt{r_1 r_2}} \cos\left[\theta - \frac{1}{2}(\theta_1 + \theta_2)\right] - 1 \right\} \tag{10}$$

$$\frac{1}{2}(\sigma_{22} + \sigma_{11}) = -\Delta p_f \left\{ \frac{r \sin\theta}{a} \left(\frac{a^2}{r_1 r_2}\right)^{15} \sin\left[\frac{3}{2}(\theta_1 + \theta_2)\right] \right\} \tag{11}$$

$$\tau_{12} = -\Delta p_f \left\{ \frac{r \sin\theta}{a} \left(\frac{a^2}{r_1 r_2}\right)^{15} \cos\left[\frac{3}{2}(\theta_1 + \theta_2)\right] \right\} \tag{12}$$

$$\sigma_{33} = v(\sigma_{11} + \sigma_{22}) \tag{13}$$

$$p_f = p_{net} = p_{frac} - S_{hmin} \tag{14}$$

$$r = (r_1 r_2)^{1/2} \tag{15}$$

$$r_1 = \sqrt{x_1^2 + (x_2 - a)^2} \quad \theta_1 = \tan^{-1}(x_1/(x_2 - a)) \tag{16}$$

$$r_2 = \sqrt{x_1^2 + (x_2+a)^2} \quad \theta_2 = \tan^{-1}(x_1/(x_2+a)) \quad (17)$$

where $\sigma_{11}$ represents formation stress in the horizontal direction (or "x" direction in a x-y-z 3D coordinate space), $\sigma_{22}$ represents formation stress in the vertical (or "y") direction, $\sigma_{33}$ represents formation stress in the "z" direction, $\tau_{12}$ shear stress in the "x-y" direction, v is Poisson's ratio, p is net pressure, $S_{hmin}$ is the minimal horizontal principal stress, and α is the fracture half length. An example of a stress field 500 including a representation of certain stress field parameters as expressed in Equations (10)-(17) above for a given fracture geometry is illustrated in FIG. 5. In one or more embodiments, formation properties, such as the minimal horizontal principal stress and the Poisson's ratio, may be appropriately adjusted or tuned using DSS measurements obtained during the stimulation treatment, as described above, in order to make the stress calculations more accurate.

Figure 6:
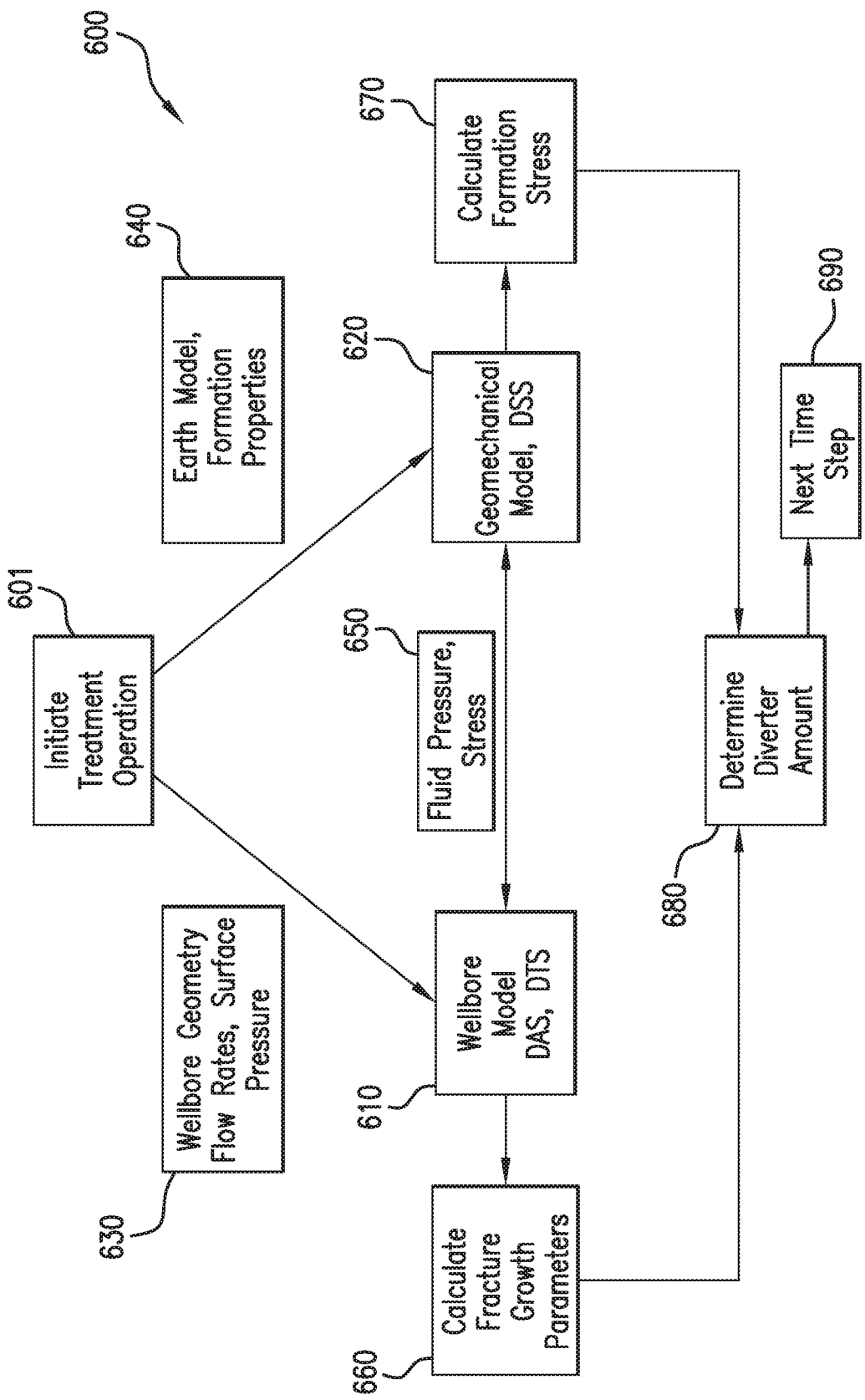
FIG. 6 is a flow diagram of an illustrative process for estimating diverter amounts during a stimulation treatment using a fully-coupled diversion model with real-time fiber-optic measurements.

FIG. 6 is a flow diagram of an illustrative process 600 for determining diverter amounts during a stimulation treatment using a fully-coupled diversion model with real-time fiber-optic measurements. The fully-coupled diversion model in this example may include a wellbore model 610 and a geomechanical model 620. The fully-coupled diversion model of process 600 may be implemented using, for example, the fully-coupled diversion model 300 of FIG. 3, as described above. Thus, the wellbore model 610 may be implemented using a combination of the wellbore models 310 along with the DAS and DTS real-time data 315 of FIG. 3, as described above. Likewise, the geomechanical model 620 may be implemented using the geomechanical model 320 along with the DSS real-time data 325 of FIG. 3, as described above.

As shown in FIG. 6, process 600 begins in block 601, when the stimulation treatment operation is initiated. The treatment operation may be performed by injecting treatment fluids into a subsurface formation via injection points (e.g., injection points 210 and 220 of FIG. 2) along a portion of a wellbore, as described above. In one or more embodiments, block 601 may include determining fracture growth and stress within a fractured area of the formation surrounding the portion of the wellbore, based on real-time measurements obtained from the DAS, DTS, and DSS fiber-optic data sources at the well site.

In block 630, various wellbore model inputs may be applied to the wellbore model 610. The wellbore model inputs applied in block 630 may include, but are not limited to the wellbore geometry, flow rates, and surface pressure. Similarly, in block 640, various geomechanical model inputs may be applied to the geomechanical model 620. The geomechanical model inputs applied in block 640 may include, but are not limited to, a mechanical earth model of the formation and one or more formation properties. As will be described in further detail below, the inputs applied to each of the models 610 and 620 may be used to calculate relevant parameters for characterizing or monitoring the fracture growth within the formation and the formation stress, respectively.

In block 650, a fluid pressure may be determined using the wellbore model 610. The fluid pressure may affect the fracture growth and stress within the formation. In one or more embodiments, the fluid pressure determined using the wellbore model 610 in block 650 may be provided as an input to the geomechanical model 620. The wellbore model 610 may also be used in block 660 to calculate values for other parameters affecting the fracture growth within the formation. Such parameters may include, but are not limited to, fluid flow, temperature, fracture geometry, and a mass of the diverter. In block 670, the geomechanical model 620 may be used to determine the formation stress. The fracture growth and formation stress values from blocks 660 and 670 may then be used in block 680 to determine a diverter amount for a diversion phase of the stimulation treatment to be performed along the portion of the wellbore in this example.

In one or more embodiments, the above-described operations for process 600 may be performed iteratively over a plurality of time steps. At each time step, the diverter amount from a previous time step or from a baseline diverter pumping schedule, as described above, may be adjusted or optimized based on current operating conditions and the fracture growth and stress field over different stages of the stimulation treatment along the wellbore within the formation. Accordingly, in block 690, the diverter amount from block 680 along with one or more of the fracture growth and stress values (e.g., flow rate, pressure, temperature, and stress field) from blocks 660 and 670 may be provided as inputs to the fully-coupled diversion model (including models 610 and 620) for determining a new diverter amount (or adjusting the previous amount) during the next time step.

Figure 7:
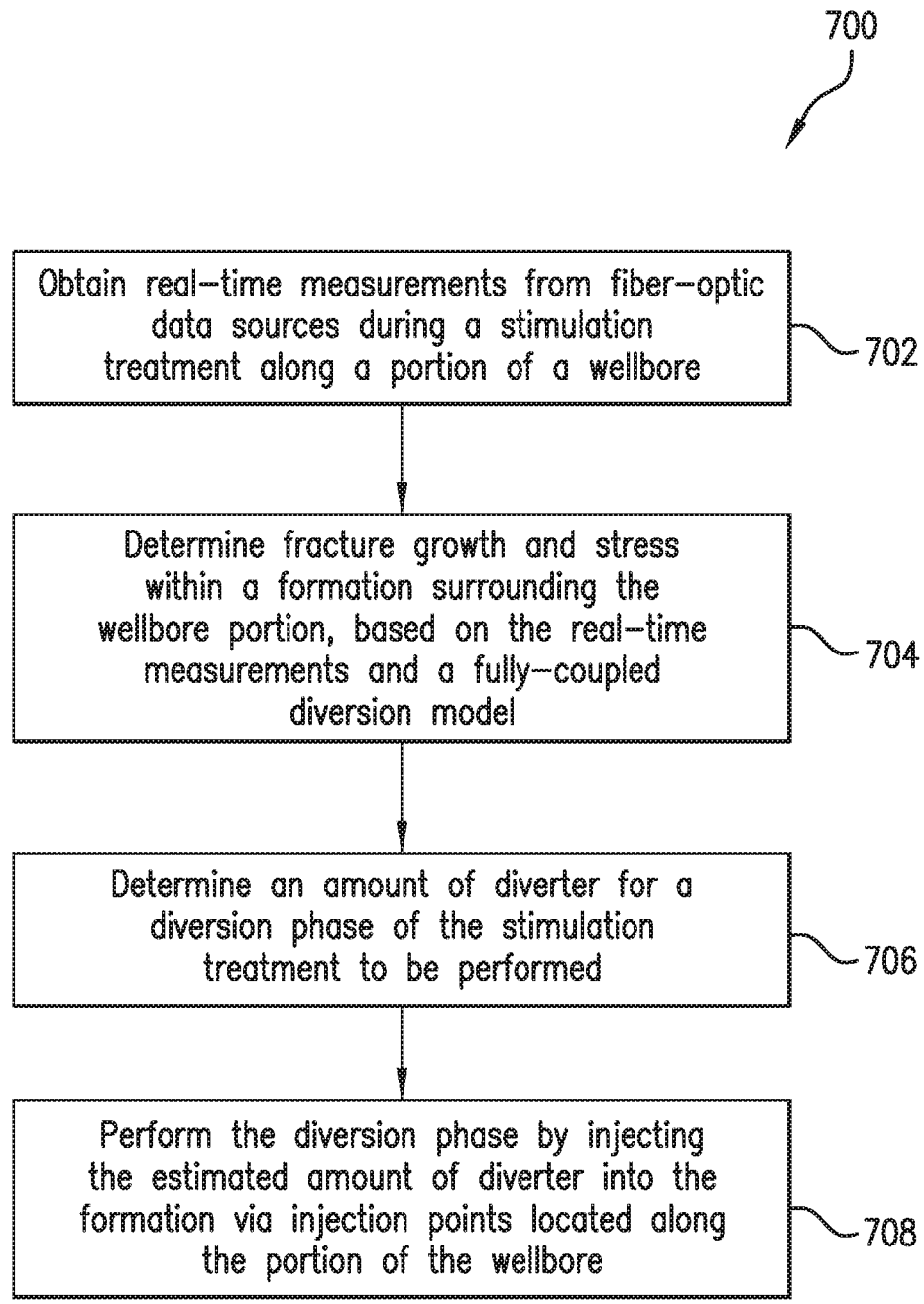
FIG. 7 is a flow diagram of an illustrative process for performing fluid diversion during a multistage stimulation treatment using a fully-coupled diversion model with real-time fiber-optic measurements.

FIG. 7 is a flow diagram of an illustrative process 700 for performing fluid diversion during a multistage stimulation treatment using a fully-coupled diversion model with real-time fiber-optic measurements. For discussion purposes, process 700 will be described using the wellbore system 100 of FIG. 1 and the fully-coupled diversion model 300 of FIG. 3, as described above. However, process 700 is not intended to be limited thereto. It is assumed for purposes of this example that the stimulation treatment is a multistage stimulation treatment, e.g., a multistage hydraulic fracturing treatment, in which each stage of the treatment is conducted along a portion of a wellbore drilled within a subsurface formation. For example, each stage of the treatment may correspond to at least one of the sections 118 along the wellbore 102 of FIG. 1, as described above.

As will be described in further detail below, process 700 may include estimating an appropriate amount of diverter to be injected into the surrounding formation during a diversion phase of the stimulation treatment. The amount of diverter injected into the formation may be used to control the distribution of treatment fluid injected into the formation via injection points located along a portion of the wellbore during each stage of the treatment. The subsurface formation in this example may be any of various types of formation including, but not limited to, tight sand, shale, or other type of rock formation with trapped deposits of unconventional hydrocarbon resources, e.g., oil and/or natural gas. The subsurface formation or a portion thereof may be targeted as part of a treatment plan for stimulating the production of such resources from the rock formation. Accordingly, process 700 may be used to appropriately adjust or optimize such a treatment plan in real-time so as to improve the downhole flow distribution of the injected treatment fluid over each stage of the stimulation treatment.

Process 700 begins in block 702, which includes obtaining real-time measurements from fiber-optic data sources at a well site during a stimulation treatment being performed along a portion of a wellbore within a subsurface formation.

In block 704, fracture growth and stress within the surrounding formation are determined as the stimulation treatment is performed along the portion of the wellbore. The fracture growth and stress determined in block 704 may be based on the real-time measurements obtained in block 702 and a fully-coupled diversion model (e.g., model 300 of FIG. 3, as described above).

In block 706, an amount of diverter for a diversion phase of the stimulation treatment to be performed along the portion of the wellbore is determined, based on the fracture growth and stress.

In block 708, the diversion phase of the stimulation treatment is performed by injecting the amount of diverter into the subsurface formation via injection points located along the portion of the wellbore.

In contrast with conventional solutions, process 700 incorporates real-time measurements from various fiber-optic data sources at a well site with a fully-coupled diversion model for controlling fluid diversion during each stage of a stimulation treatment along a wellbore. This allows for better optimization of the treatment as intra-stage effects on formation entry point or perforation cluster and fracture efficiency can be accounted for in the treatment design, allowing for better partitioning of the treatment, more efficient fracture geometries, and a more effective stimulation treatment overall. Other advantages of process 700 over conventional solutions include, but are not limited to, maximizing cluster efficiency while minimizing unnecessary use of treatment fluid, proppant, diverter, and other material pumped or injected into the formation over the course of the entire treatment, thereby reducing waste and providing additional cost savings for the wellsite operator.

Figure 8:
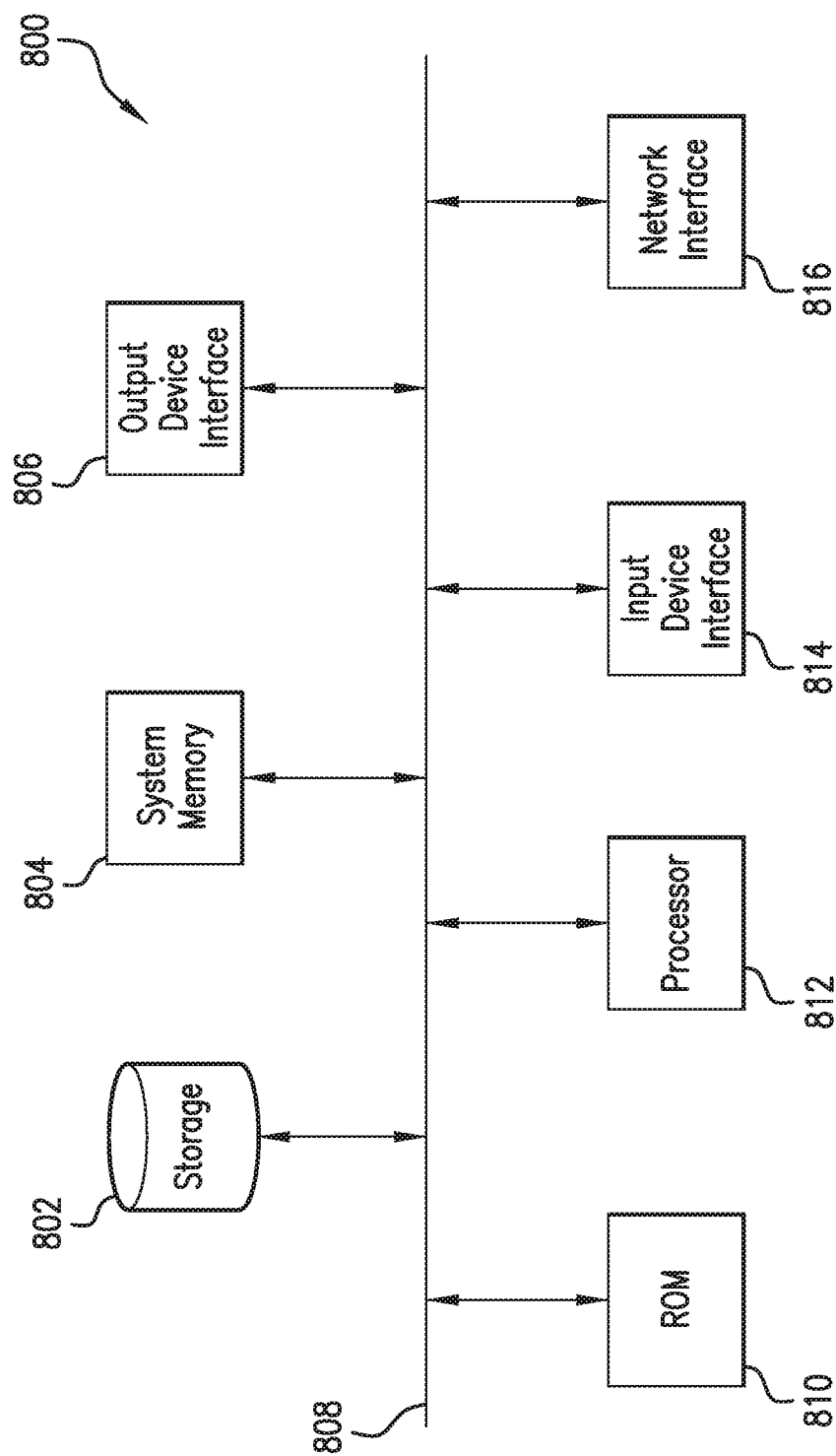
FIG. 8 is a block diagram of an illustrative computer system in which embodiments of the present disclosure may be implemented.

FIG. 8 is a block diagram of an exemplary computer system 800 in which embodiments of the present disclosure may be implemented. For example, the injection control subsystem 111 (or data processing components thereof) of FIG. 1 and processes 600 and 700 of FIGS. 6 and 7, respectively, as described above, may be implemented using system 800. System 800 can be a computer, phone, PDA, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for performing the diversion control techniques disclosed herein, e.g., according to processes 600 and 700 of FIGS. 6 and 7, respectively, as described above. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes 600 and 700 of FIGS. 6 and 7, respectively, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for controlling fluid diversion during stimulation treatments. A method of controlling fluid diversion during stimulation treatments is described, where the method includes: obtaining real-time measurements from a plurality of fiber-optic data sources at a well site during a stimulation treatment being performed along a portion of a wellbore within a subsurface formation; determining fracture growth and stress within the subsurface formation surrounding the portion of the wellbore as the stimulation treatment is performed, based on the real-time measurements and a fully-coupled diversion model; determining an amount of diverter for a diversion phase of the stimulation treatment to be performed along the portion of the wellbore, based on the fracture growth and the stress within the subsurface formation; and performing the diversion phase of the stimulation treatment by injecting the amount of diverter into the subsurface formation via at least one injection point located along the portion of the wellbore. Likewise, a computer-readable storage medium is described, where the computer-readable storage medium has instructions stored therein, which when executed by a computer cause the computer to perform a plurality of functions, including functions to: obtain real-time measurements from a plurality of fiber-optic data sources at a well site during a stimulation treatment being performed along a portion of a wellbore within a subsurface formation; determine fracture growth and stress within the subsurface formation surrounding the portion of the wellbore as the stimulation treatment is performed, based on the real-time measurements and a fully-coupled diversion model; determine an amount of diverter for a diversion phase of the stimulation treatment to be performed along the portion of the wellbore, based on the fracture growth and stress; and perform the diversion phase of the stimulation treatment by injecting the estimated amount of diverter into the subsurface formation via at least one injection point located along the portion of the wellbore.

In one or more embodiments, the foregoing method or computer-readable medium may include respective steps or instructions for performing functions relating to any of the following elements, alone or in combination with each other: the plurality of fiber-optic data sources may include Distributed Acoustic Sensing (DAS), Distributed Temperature Sensing (DTS), and Distributed Strain Sensing (DSS) equipment coupled to the wellbore; the fully-coupled diversion model may include a wellbore model and a geomechanical model; the wellbore model may include a fluid flow model, a diverter model, a fluid temperature model and a fracture model; the fluid flow model may be a one-dimensional (1D) fluid flow model for determining a flow of treatment fluid into the subsurface formation via the at least one injection point located along the portion of the wellbore; the 1D fluid flow model may determine the flow of the treatment fluid, based on a fluid pressure along the wellbore, a wellbore alignment direction, a fluid density, and a leak-off rate of the treatment fluid into the subsurface formation; the fracture growth may be determined using the wellbore model, and the stress within the subsurface formation is determined using the geomechanical model; the real-time measurements may include Distributed Acoustic Sensing (DAS), Distributed Temperature Sensing (DTS), and Distributed Strain Sensing (DSS) measurements; the DAS and DTS measurements may be applied as inputs to the wellbore model, and the fracture growth may be determined based on a fluid flow, a fluid pressure, a fluid temperature, and a fracture geometry may be determined by the wellbore model from the applied DAS and DTS measurements; and the DSS measurements may be applied as inputs to the geomechanical model, and the geomechanical model may be used to determine the stress within the subsurface formation based on the applied DSS measurements.

Furthermore, a system including at least one processor and a memory coupled to the processor is described. The memory stores instructions, which when executed by the processor, cause the processor to perform a plurality of functions, including functions to: obtain real-time measurements from a plurality of fiber-optic data sources at a well site during a stimulation treatment being performed along a portion of a wellbore within a subsurface formation; determine fracture growth and stress within the subsurface formation surrounding the portion of the wellbore as the stimulation treatment is performed, based on the real-time measurements and a fully-coupled diversion model; determine an amount of diverter for a diversion phase of the stimulation treatment to be performed along the portion of the wellbore, based on the fracture growth and the stress within the subsurface formation; and perform the diversion phase of the stimulation treatment by injecting the amount of diverter into the subsurface formation via at least one injection point located along the portion of the wellbore.

In one or more embodiments, the foregoing system may include any of the following elements, alone or in combination with each other: the plurality of fiber-optic data sources may include Distributed Acoustic Sensing (DAS), Distributed Temperature Sensing (DTS), and Distributed Strain Sensing (DSS) equipment coupled to the wellbore; the fully-coupled diversion model may include a wellbore model and a geomechanical model; the wellbore model may include a fluid flow model, a diverter model, a fluid temperature model and a fracture model; the fluid flow model may be a one-dimensional (1D) fluid flow model for determining a flow of treatment fluid into the subsurface formation via the at least one injection point located along the portion of the wellbore; the 1D fluid flow model may determine the flow of the treatment fluid, based on a fluid pressure along the wellbore, a wellbore alignment direction, a fluid density, and a leak-off rate of the treatment fluid into the subsurface formation; the fracture growth may be determined using the wellbore model, and the stress within the subsurface formation is determined using the geomechanical model; the real-time measurements may include Distributed Acoustic Sensing (DAS), Distributed Temperature Sensing (DTS), and Distributed Strain Sensing (DSS) measurements; the DAS and DTS measurements may be applied as inputs to the wellbore model, and the fracture growth may be determined based on a fluid flow, a fluid pressure, a fluid temperature, and a fracture geometry may be determined by the wellbore model from the applied DAS and DTS measurements; and the DSS measurements may be applied as inputs to the geomechanical model, and the geomechanical model may be used to determine the stress within the subsurface formation based on the applied DSS measurements.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed.

Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of controlling fluid diversion during stimulation treatments, the method comprising:
   obtaining real-time measurements from a plurality of fiber-optic data sources at a well site during a stimulation treatment being performed along a portion of a wellbore within a subsurface formation, the real-time measurements including Distributed Acoustic Sensing (DAS) measurements, Distributed Temperature Sensing (DTS) measurements, and Distributed Strain Sensing (DSS) measurements,
   determining fracture growth and stress within the subsurface formation surrounding the portion of the wellbore as the stimulation treatment is performed, based on the real-time measurements and a fully-coupled diversion model, the fully-coupled diversion model including a wellbore model and a geomechanical model of the subsurface formation;
   determining an amount of diverter for a diversion phase of the stimulation treatment to be performed along the portion of the wellbore, based on the fracture growth and the stress within the subsurface formation; and
   performing the diversion phase of the stimulation treatment by injecting the amount of diverter into the subsurface formation via at least one injection point located along the portion of the wellbore.

2. The method of claim 1, wherein the plurality of fiber-optic data sources include Distributed Acoustic Sensing (DAS), Distributed Temperature Sensing (DTS), and Distributed Strain Sensing (DSS) equipment coupled to the wellbore.

3. The method of claim 1, wherein the real-time measurements are applied as inputs to each of the wellbore model and the geomechanical model.

4. The method of claim 3, wherein the wellbore model includes a fluid flow model, a diverter model, a fluid temperature model and a fracture model.

5. The method of claim 4, wherein the fluid flow model is a one-dimensional (1D) fluid flow model for determining a flow of treatment fluid into the subsurface formation via the at least one injection point located along the portion of the wellbore.

6. The method of claim 5, wherein the 1D fluid flow model determines the flow of the treatment fluid, based on a fluid pressure along the wellbore, a wellbore alignment direction, a fluid density, and a leak-off rate of the treatment fluid into the subsurface formation.

7. The method of claim 3, wherein the fracture growth is determined using the wellbore model, and the stress within the subsurface formation is determined using the geomechanical model.

8. The method of claim 3, wherein the DAS and DTS measurements are applied as inputs to the wellbore model to calculate values for a plurality of parameters affecting the fracture growth within the subsurface formation, the plurality of parameters include a fluid flow, a fluid pressure, a fluid temperature, and a fracture geometry, and the fracture growth is determined based on the values of the plurality of parameters calculated by the wellbore model from the applied DAS and DTS measurements.

9. The method of claim 3, wherein the DSS measurements are applied as inputs to the geomechanical model, and the geomechanical model is used to determine the stress within the subsurface formation based on the applied DSS measurements.

10. A system comprising:
    at least one processor; and
    a memory coupled to the processor having instructions stored therein, which when executed by the processor, cause the processor to perform a plurality of functions, including functions to:
    obtain real-time measurements from a plurality of fiber-optic data sources at a well site during a stimulation treatment being performed along a portion of a wellbore within a subsurface formation, the real-time measurements including Distributed Acoustic Sensing (DAS) measurements, Distributed Temperature Sensing (DTS) measurements, and Distributed Strain Sensing (DSS) measurements;
    determine fracture growth and stress within the subsurface formation surrounding the portion of the wellbore as the stimulation treatment is performed, based on the real-time measurements and a fully-coupled diversion model, the fully-coupled diversion model including a wellbore model and a geomechanical model of the subsurface formation;
    determine an amount of diverter for a diversion phase of the stimulation treatment to be performed along the portion of the wellbore, based on the fracture growth and the stress within the subsurface formation; and
    perform the diversion phase of the stimulation treatment by injecting the amount of diverter into the subsurface formation via at least one injection point located along the portion of the wellbore.

11. The system of claim 10, wherein the plurality of fiber-optic data sources include Distributed Acoustic Sensing (DAS), Distributed Temperature Sensing (DTS), and Distributed Strain Sensing (DSS) equipment coupled to the wellbore.

12. The system of claim 10, wherein the real-time measurements are applied as inputs to each of the wellbore model and the geomechanical model.

13. The system of claim 12, wherein the wellbore model includes a fluid flow model, a diverter model, a fluid temperature model and a fracture model.

14. The system of claim 13, wherein the fluid flow model is a one-dimensional (1D) fluid flow model for determining a flow of treatment fluid into the subsurface formation via the at least one injection point based on a fluid pressure along the wellbore, a wellbore alignment direction, a fluid density, and a leak-off rate of the treatment fluid into the subsurface formation.

15. The system of claim 12, wherein the fracture growth is determined using the wellbore model, and the stress within the subsurface formation is determined using the geomechanical model.

16. The system of claim 12, wherein the DAS and DTS measurements are applied as inputs to the wellbore model to calculate values for a plurality of parameters affecting fracture growth within the subsurface formation, the plurality of parameters include a fluid flow, a fluid pressure, a fluid temperature, and a fracture geometry, and the fracture growth is determined based on the values of the plurality of parameters calculated by the wellbore model from the applied DAS and DTS measurements.

17. The system of claim 12, wherein the DSS measurements are applied as inputs to the geomechanical model, and the geomechanical model is used to determine the stress within the subsurface formation based on the applied DSS measurements.

18. A computer-readable storage medium having instructions stored therein, which when executed by a computer cause the computer to perform a plurality of functions, including functions to:

obtain real-time measurements from a plurality of fiber-optic data sources at a well site during a stimulation treatment being performed along a portion of a wellbore within a subsurface formation, the real-time measurements including Distributed Acoustic Sensing (DAS) measurements, Distributed Temperature Sensing (DTS) measurements, and Distributed Strain Sensing (DSS) measurements;

determine fracture growth and stress within the subsurface formation surrounding the portion of the wellbore as the stimulation treatment is performed, based on the real-time measurements and a fully-coupled diversion model, the fully-coupled diversion model including a wellbore model and a geomechanical model of the subsurface formation;

determine an amount of diverter for a diversion phase of the stimulation treatment to be performed along the portion of the wellbore, based on the fracture growth and stress; and perform the diversion phase of the stimulation treatment by injecting the estimated amount of diverter into the subsurface formation via at least one injection point located along the portion of the wellbore.

* * * * *